United States Patent [19]

Schwab et al.

[11] 4,287,533
[45] Sep. 1, 1981

[54] APPARATUS FOR RECORDING AND PLAYING BACK RADAR VIDEO WITH CONVENTIONAL VIDEO RECORDER

[75] Inventors: Carl E. Schwab, Huntington Station; Peter Foley, Manhasset; Charles A. Caputo, Stony Brook, all of N.Y.

[73] Assignee: General Signal Corporation, Stamford, Conn.

[21] Appl. No.: 59,703

[22] Filed: Jul. 23, 1979

Related U.S. Application Data

[63] Continuation of Ser. No. 783,887, Apr. 1, 1977, abandoned.

[51] Int. Cl.³ .............................................. H04N 5/76
[52] U.S. Cl. ................................. 358/127; 343/5 PC; 343/6 TV; 343/5 SC; 360/33; 360/37; 360/18; 360/64
[58] Field of Search ............... 343/5 PC, 6 TV, 5 SC; 360/33, 37, 18, 32, 64, 53; 358/127, 140, 147, 153

[56] References Cited

U.S. PATENT DOCUMENTS

| | | | |
|---|---|---|---|
| 3,346,702 | 10/1967 | Heizer | 360/64 |
| 3,401,231 | 9/1968 | Baldwin | 360/64 |
| 3,483,318 | 12/1969 | Iwoi | 360/37 |
| 3,725,912 | 4/1973 | Buckholy | 343/5 PC |
| 3,889,293 | 6/1975 | Muroco | 343/5 PC |
| 4,047,170 | 9/1977 | Miller | 343/5 PC |
| 4,120,007 | 10/1978 | Sato | 360/64 |

FOREIGN PATENT DOCUMENTS 1289584 9/1972 United Kingdom .................. 343/5 PC Primary Examiner—James W. Moffitt
Assistant Examiner—Alan Faber
Attorney, Agent, or Firm—Pollock, Vande Sande & Priddy

[57] ABSTRACT

Apparatus for recording and play back of radar video employs a conventional TV video recorder. A multiplexer accepts radar timing signals, synchro data definitive of azimuth, a 60 Hz. reference as well as radar video and formats the signals for recording. A demultiplexer accepts video signals formatted as above, from the conventional video recorder and reformats the signals to drive a conventional PPI display. The video recorder is unmodified so conventional TV video can also be recorded or played back, interspersed, if desired, with the radar video.

9 Claims, 10 Drawing Figures

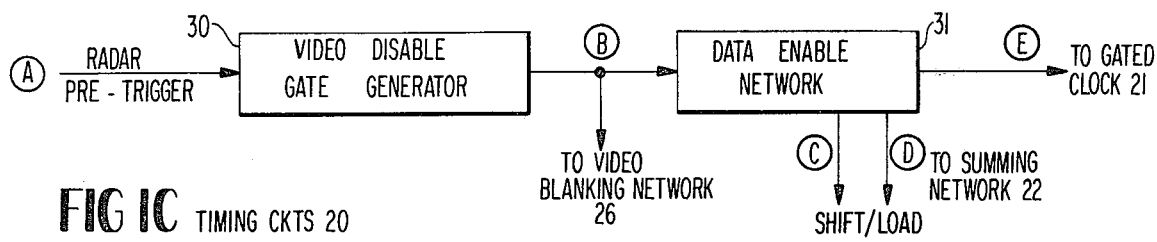
FIG 1C TIMING CKTS 20
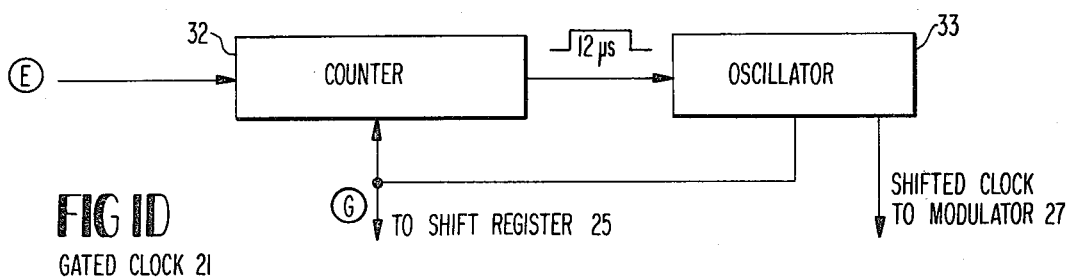
FIG 1D GATED CLOCK 21
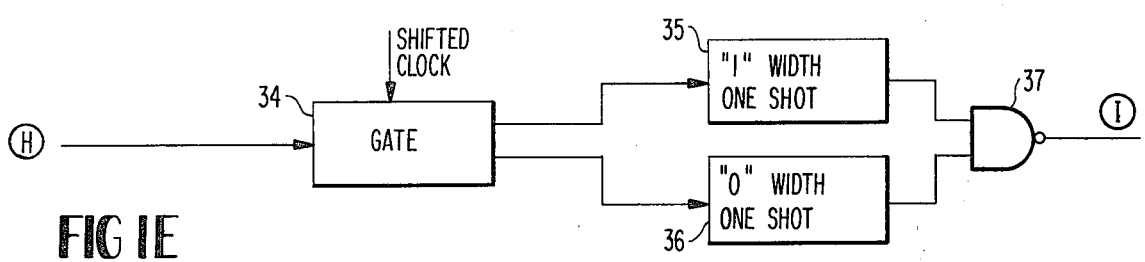
FIG 1E PULSE WIDTH MODULATOR 27
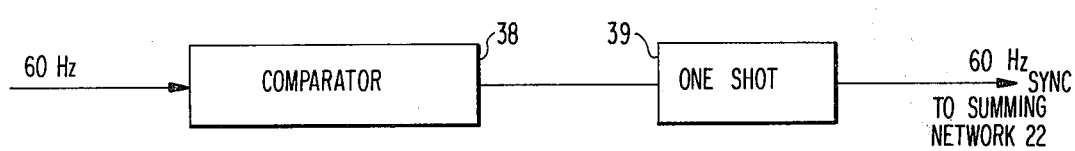
FIG 1F SHAPING CKT 29
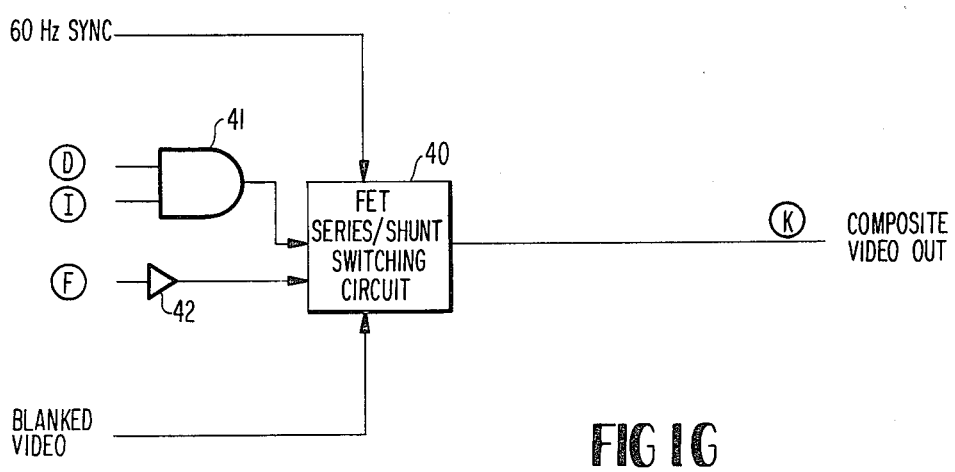
FIG 1G SUMMING NETWORK 22

PLAYBACK MODE

APPARATUS FOR RECORDING AND PLAYING BACK RADAR VIDEO WITH CONVENTIONAL VIDEO RECORDER

This is a continuation of application Ser. No. 783,887 filed Apr. 1, 1977, now abandoned.

FIELD OF THE INVENTION

The present invention relates to apparatus enabling a conventional video recorder to record and play back radar video signals.

BACKGROUND OF THE INVENTION

For many years, the recording and playback of electrical signals has been accomplished with magnetic tape recorders, employing apparatus and techniques well known to the art. Although recording video signals, because of their larger bandwidth, requires more complex and expensive apparatus, video recording has been accomplished, also with apparatus and techniques well known in the art. The recording and playback of TV video signals has, for a number of reasons, advanced at a rapid rate, and indeed resulted in the appearance of consumer products which perform this function. With the advent of mass marketing, the high production rates for this apparatus has dramatically decreased the price of TV video recorders.

Video recorders in general, and the TV video recorders in particular, require a high effective tape speed to accept the wide video bandwidths. The earliest video recorders achieved high tape speed by merely running the tape drive at a sufficient velocity. The problem associated with such high tape speeds is that it requires vast amounts of tape for a given program material. The conventional TV video recorders employ apparatus in which the tape travels in one direction and the magnetic head is driven in another direction in order to achieve high relative velocities without requiring high tape velocity. Of course, the tape head must be regularly repositioned, but in TV video recording, the head repositioning is accomplished during frame retrace and thus no special precautions need be taken with the format of the video signal applied to the conventional video recorder.

Apparatus for recording other video signals, such as radar video signals, is associated with custom-made one-of-a-kind features with associated high costs. It is therefore one object of the present invention to provide apparatus which allows recording of radar video on conventional TV video recorders. It is another object of the present invention to provide apparatus to allow a radar video signal recorded on a conventional TV recorder to be played back and drive a conventional PPI display. It is another object of the present invention to provide a multiplexer, capable of accepting radar video data, signals definitive of azimuth and a 60 Hz. reference timing signal, to format the signals for recording on a conventional TV recorder. It is another object of the present invention to provide a demultiplexer for responding to signals played back from such a conventional TV recorder and reformatting the signals in order to drive a conventional PPI display.

SUMMARY OF THE INVENTION

These and other objects of the invention are met by providing a multiplexer for accepting radar video signals, radar timing signals, radar signals definitive of antenna azimuth as well as a 60 Hz. reference signal, and for formatting the signals for recording with a conventional TV video recorder. The multiplexer of the present invention accepts the radar timing signal, and generates a video blanking signal, a synchro data shift/load signal, a data enable signal, and a signal for driving a gated clock generator. The video blanking signal is employed in a video blanking network, to which the video radar signal is applied, for blanking the radar video for a predetermined duration at a selected time position relative to the radar timing signal. The period during which the video signal is blanked is used by filling it with a radar trigger signal and digital data definitive of antenna azimuth. A synchro to digital converter may accept synchro data, and in response to the shift/load signal, load the data in parallel into a shift register. On the other hand, if digital information defining antenna azimuth is available it is loaded into a shift register. In either event a gated clock generator provides properly timed shift pulses to shift out the contents of the shift register in a serial stream. The serial stream of data definitive of azimuth is provided to a pulse width modulator, which also has applied to it another output of the gated clock generator. The pulse width modulator produces a serial stream of pulse width modulated pulses representing antenna azimuth. The 60 Hz. reference signal is employed to generate a stream of synchronizing pulses for synchronizing recorder head movement. The synchronizing pulses, pulse width modulator output, radar trigger signals and the output of the video blanking network are applied to a summing network which produces a composite video signal containing a radar trigger, pulse width modulated digital data definitive of azimuth, radar video and a sync pulse. This composite signal may be applied to a conventional TV video recorder for recording purposes.

The present invention also provides a demultiplexer for accepting such composite video signals from a conventional TV video recorder and providing signals which can be used to drive a conventional PPI display.

More particularly, the demultiplexer accepts the composite video signal stream. A video processor strips the sync pulses, azimuth data pulses and radar trigger from the signal stream and provides the remaining radar video signal to the PPI display. At the same time, an azimuth data processor responds to the composite video signal stream and, employing another gated clock generator, demodulates the azimuth pulses and provides them, in either parallel format or as synchro data to the PPI display. A radar trigger regenerator responds to the composite video stream and provides a radar trigger pulse to the PPI.

From the foregoing it should be apparent that the outputs of a conventional radar system can be applied to the multiplexer of the present invention, and the multiplexer will provide an output capable of being recorded on a conventional TV video recorder. At the same time, the output of a conventional TV video recorder, on which radar video signals have been recorded employing the multiplexer of the present invention, can be applied to the demultiplexer of the present invention, which provides an output capable of driving a conventional PPI display. These functions are achieved without modifying the conventional TV video recorder so that, if desired, conventional TV video (and audio) can be interspersed on the tape with radar video signals. This capability provides significant advantages, as will be explained below.

BRIEF DESCRIPTION OF THE DRAWINGS

The apparatus of the present invention will now be described in more detail in the following portions of this description when taken into conjunction with the attached drawings in which like reference characters identify identical apparatus and in which:

FIGS. 1C–1G disclose more detailed block diagrams of several components of the multiplexer of the invention;

DETAILED DESCRIPTION OF THE INVENTION

Conventional radar equipment is well known to those skilled in the art; such equipment will only be described here to the extent necessary to provide a basis for the signals produced thereby which are available for use in a recording and playback system. For purposes of the present application, we can consider three (3) signals provided by radar apparatus: (1) the radar video signal which is an amplified version of the return signal detected by the antenna; (2) a radar timing signal which defines the beginning of the radar cycle; and (3) signals, usually derived from a synchro, definitive of antenna azimuth. Some radar equipment provides digital information on azimuth and if available such signals can be used with the inventive apparatus. For proper display, all this information is necessary, and therefore, this information must be recorded if a PPI display is to be driven from the recorder playback. Furthermore, in order to synchronize the recorder, synchronizing pulses are required. The recorder is synchronized so that head retrace occurs during the synchronizing pulse to insure that no video is lost during the head retrace.

Figure 1A:
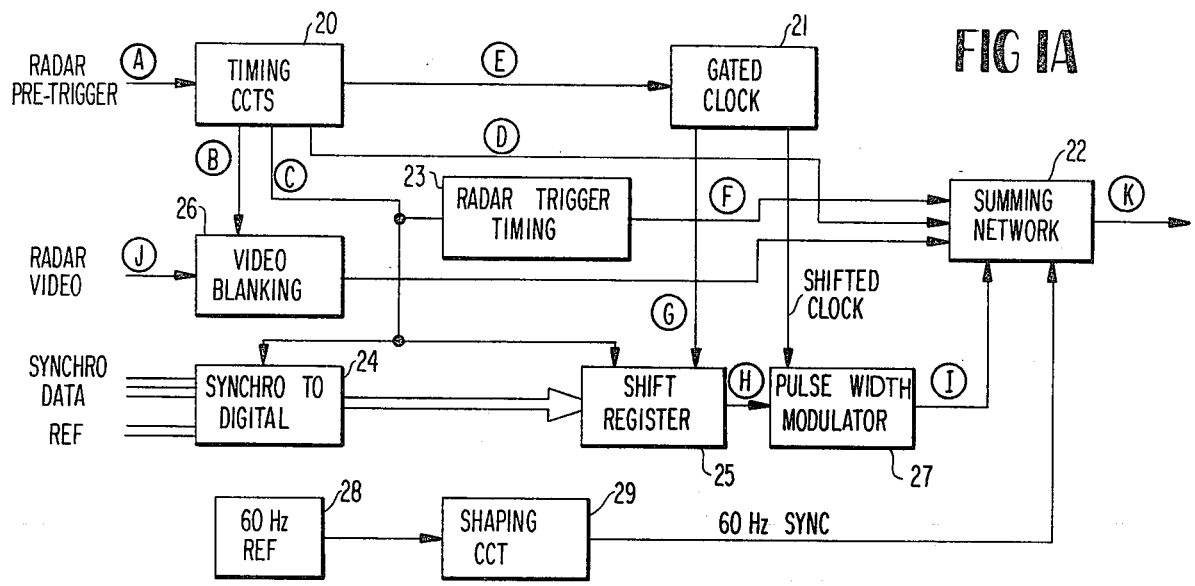
FIG. 1A is a block diagram of the multiplexer of the present invention.
Figure 1B:
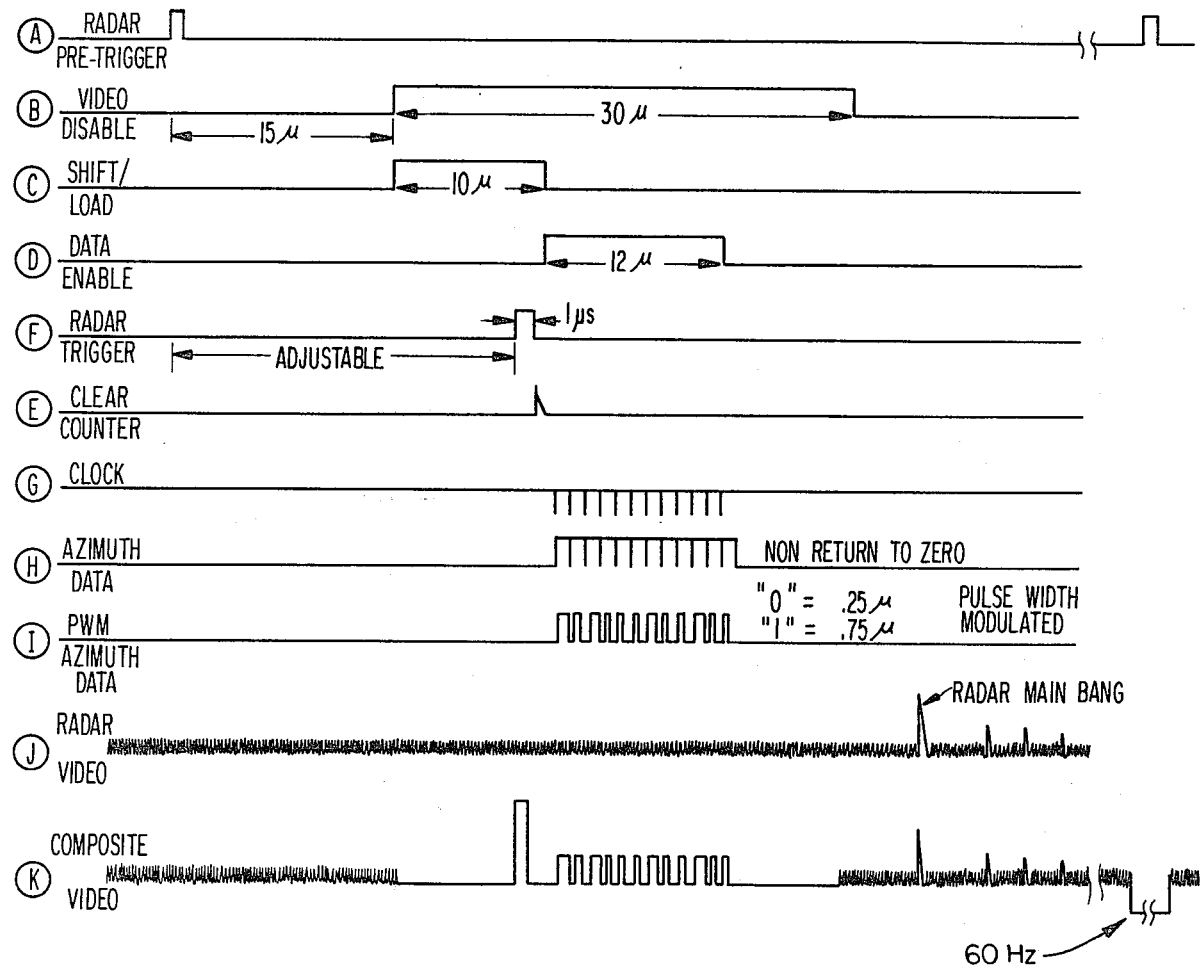
FIG. 1B illustrates typical timing of signals found at specified locations in the circuit of the multiplexer.

The multiplexer, which accepts signals from the radar equipment and provides them in a form suitable for recording on a conventional TV video recorder, is illustrated in block diagram form in FIG. 1A. As shown there, the multiplexer includes a series of timing circuits 20, providing a number of outputs, one of which is connected to a gated clock 21. Several of the waveforms produced by the apparatus of FIG. 1A are identified by letters and the correspondingly identified waveform is shown in FIG. 1B. Thus, the just mentioned timing circuit output is E (CLEAR COUNTER) and is shown in FIG. 1B. Another output D of the timing circuits 20 is provided to a summing network 22. A further output C of the timing circuit is provided to the radar trigger timing circuit 23 and to the synchro to digital converter 24 and shift register 25. Finally, another output B of the timing circuits is applied to a video blanking circuit 26. The radar trigger timing circuit 23 provides an output F to the summing network 22. The synchro data, and synchro reference signals are provided to the synchro to digital converter 24, which provides an input to the shift register 25. This shift register provides an output H, under the control of clock signals G from gated clock 21 to the pulse width modulator 27. Pulse width modulator 27 provides a pulse width modulated data stream I under the control of shifted clock signals from gated clock 21, to the summing network 22. Finally, a 60 Hz. reference source 28 provides an input to a shaping circuit 29 which provides the sync pulse input to summing network 22.

The timing circuits 20 are shown in more detail in FIG. 1C. As shown there, the radar pre-trigger (A) is provided as an input to a video disable gate generator 30. The output of the video disable gate generator is a video disable gate (B). This provides an input to the video blanking network 26 (FIG. 1A) and also provides an input to the data enable network 31. The data enable network 31 provides three outputs, the SHIFT/LOAD (C), the DATA ENABLE (D), and the CLEAR COUNTER (E). The video disable gate generator can be implemented in a number of ways apparent to those skilled in the art. For example, the video disable gate generator could comprise a pair of monostable multivibrators, one providing a 15 microsecond delay from the pre-trigger and the other providing a 30 $\mu$s video disable gate output. Likewise, the data enable network 31 can comprise a plurality of monostable multivibrators, a first responsive to the video disable gate having an astable period of 10 microseconds, whose output provides the shift/load signal, a second monostable multivibrator can be responsive to the trailing edge of the SHIFT/LOAD and with a 12 microsecond astable period can provide the DATA ENABLE signal. Finally, a simple differentiator and shaping circuit can provide the narrow CLEAR COUNTER pulse responsive to the trailing edge of the SHIFT/LOAD signal.

The gated clock 21 is shown in more detail in FIG. 1D. As shown there, it comprises a counter 32, responsive to the CLEAR COUNTER (E) signal. One output of the counter is provided to an oscillator 33, which can comprise, in a preferred embodiment, a 1 MHz. oscillator. Included in the oscillator 33, but not separately illustrated, are shaping circuits to provide square pulses rather than sinusoidal output from a simple oscillator. Two outputs are provided, shifted 180° in phase from each other. A first output (G) is provided to the shift register 25, the second output (shifted clock) is provided to the modulator 27. The first output is fed back and increments the counter 32. Counter 32 can, for example, be arranged to count 12 pulses and then reset itself and thereby disable the oscillator 33.

The pulse width modulator 27 is shown in more detail in FIG. 1E. The pulse width modulator 27 accepts a serial stream of data from the shift register 25 under control of the clock pulses (G). This serial data stream is provided to a gating network 34, which is also provided with the shifted clock pulses from the oscillator 33. At every occurrence of a shifted clock, the gate network 34 provides a "one" bit to a one shot 35 or a "0" bit to a one shot 36. The astable period of one shots 35 and 36 are different. The outputs of both one shots 35 and 36 are provided to a NAND gate 37, whose output is the pulse width modulated data stream (I).

FIG. 1F illustrates the shaping circuit 29. As illustrated there, the 60 Hz. reference signal, from source 28, is provided as an input to a comparator 38. The output of the comparator 38 drives a one shot 39 having a 0.4 millisecond astable period. Thus, the sync pulse stream is synchronized to the 60 Hz. source and contains a series of 0.4 millisecond pulses, of negative polarity.

A particular implementation of the summing network 22 is shown in more detail in FIG. 1G. As shown there, the summing network 22 comprises a FET/SERIES/-SHUNT switching network 40 whose output is the composite video signal which will be recorded. One input to the network 40 is the output of the video blanking network 26 which is the blanked video, blanked for a predetermined period (of video disable gate) and occurring a predetermined time after the radar pre-trigger (A). A further input to network 40 is provided by an AND gate 41. One input to this AND gate is a DATA ENABLE signal from the data enable network 31 (FIG. 1C). The other input to the AND gate 41 is the pulse width modulated data stream (I) from the pulse width modulator 27. Finally, the last input to network 40 is provided by the radar trigger timing circuit 23 and comprises the radar trigger pulse which is a 1 microsecond positive pulse. As shown in FIG. 1G, this pulse is provided through an amplifier 42. The amplifier 42 is illustrated inasmuch as the radar trigger (F) is amplified to a level above that of the other positive signals applied to the network 40. The other distinctive input to network 40 is the 60 Hz. sync signal which is of negative polarity, and this is the only signal of negative polarity applied to the network 40.

Thus, the output of the summing network 22 comprises the signal train K (FIG. 1B) including the radar trigger, amplified to a relatively high level, followed the the pulse width modulated data stream defining the antenna azimuth, followed by the radar video itself, followed by the negative 60 Hz. synchronizing pulse. Inasmuch as the pulse repetition frequency of the radar is not necessarily synchronized to the 60 Hz. source, the negative 60 Hz. synchronizing signal runs asynchronously through the composite video, thus appearing at different locations in different frames.

As was mentioned previously, certain radar equipments, instead of employing synchro data to define antenna azimuth, make this information available in the form of binary data. For those radar equipments, the synchro to digital converter 24 can be eliminated and the binary data definitive of azimuth can be loaded, in parallel, to shift register 25 in response to the SHIFT-/LOAD signal. In other respects, the multiplexer can operate as explained above.

Figure 2A:
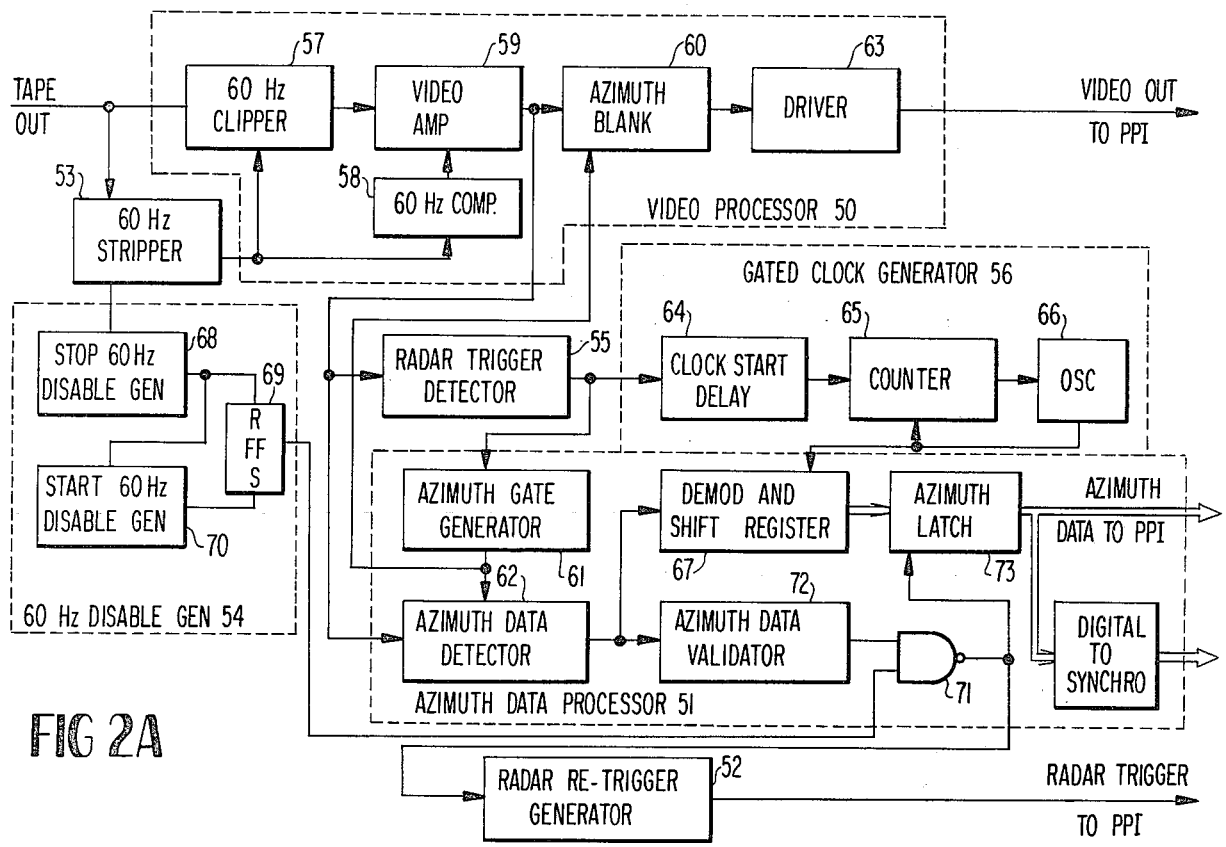
FIG. 2A is a block diagram of the demultiplexer of the present invention.

The composite video signal produced by the summing network 22 is of a form which can be recorded on a conventional TV video recorder. In order to re-create, from the so recorded data, signals to drive a PPI display with the radar information, the demultiplexer of the present invention processes the signals read off the tape by the conventional TV video recorder. FIG. 2A is a block diagram of a demultiplexer in accordance with the principles of the present invention. The demultiplexer of the present invention includes a video processor to which the tape output signal is provided. One output of video processor is a radar video signal which can be coupled to a conventional PPI display. Another output of the video processor is provided to the azimuth data processor which provides azimuth data in digital or synchro format to the PPI display. Another output of the azimuth data processor is provided to the radar re-trigger generator 52, which provides the radar trigger for the PPI display. The demultiplexer also includes a 60 Hz. stripper 53 and a 60 Hz. disable generator 54, the purpose for which will be explained below. Also included in the demultiplexer is a radar trigger detector 55 which drives both the azimuth data processor 51 and a gated clock generator 56. The output of the gated clock generator 56 is employed by the azimuth data processor 52 in a manner which will be explained below.

One of the processing functions provided by the demultiplexer of the present invention is to remove the 60 Hz. synchronizing signals from the tape output. The signal was added merely to synchronize the video recorder and is not employed to the PPI display. To perform this function, the video processor 50 includes a 60 Hz. clipper 57. It will be recalled that the 60 Hz. synchronizing pulses are the only negative polarity signals in the data stream. Thus, the clipper 57 can comprise a clamping circuit. Although the clamp, which comprises the clipper 57, is effective to remove a majority of the negative polarity signal, it does leave an exponentially decaying pulse at the conclusion of the 60 Hz. synchronizing pulse. To remove this last vestige of the synchronizing pulse, a 60 Hz. stripper 53 and 60 Hz. compensator 58 are employed. The 60 Hz. stripper 53 may include a transistor inverter and a plurality of clamping circuits. One of the clamping circuits removes the positive portion of the signal stream, leaving only the synchronizing pulses. This signal stream is provided to the 60 Hz. compensator 58 which can include an RC generator to compensate for the vestiges of the 60 Hz. pulses outputted by the clipper 57. The output of the compensator 58 is provided as one input to a video amplifier 59, the other input to which is provided by the output of the clipper 57. The positive portions of the data stream provided by the tape recorder, pass through the 60 Hz. clipper 57, and are amplified in the amplifier 59. The vestiges of the synchronizing pulse, which are also positive, are removed by the output of the 60 Hz. compensator 58 which is a negative replica of these vestiges. The output of the video amplifier 59 is, therefore, an amplified version of the input stream less the 60 Hz. synchronizing pulses. This output is provided to the radar trigger detector 55, the azimuth data processor 51 and an azimuth blanking circuit 60.

The radar trigger detector 55 includes a voltage threshold which responds only to the radar trigger pulse inasmuch as it is at a level significantly above the remaining signals provided to it. The output of the radar trigger detector can be a constant positive potential which is reduced to zero for the duration of the radar trigger pulse, and which occurs synchronously therewith. This output is provided to the azimuth gate generator 61 which is part of the azimuth data processor 51. The azimuth gate generator provides a 14 microsecond pulse beginning at the radar trigger. This azimuth gate pulse is provided to the azimuth data detector 62 and the azimuth blanking circuit 60.

The azimuth gate pulse, at the azimuth blanking circuit 60, blanks the azimuth data as well as the radar trigger. Thus, the output of the azimuth blanking circuit 60, which is provided to a driver 63, comprises only the radar video.

The radar trigger detector 55, in addition to driving the azimuth gate generator 61, also drives the gated clock generator 56. The gated clock generator 56 includes a clock start delay 64, driving a counter 65, which controls an oscillator 66. An output of the oscillator (suitably shaped so as to be a square waveform) is fed back to the counter 65 and also provides an input to the demodulator and shift register 67, of the azimuth data processor 51. The clock start delay circuit 64 responds to the radar trigger, provided by the detector 55, and after a suitable delay, initiates the counter 65. The counter 65 is arranged to energize an oscillator 66, and to maintain the oscillator 66 energized for a predetermined period, for example, for a count of 12. The shaped output of the oscillator 66 is provided to the demodulator and shift register 67 of the azimuth data processor, for reasons which will appear hereinafter.

Figure 2B:
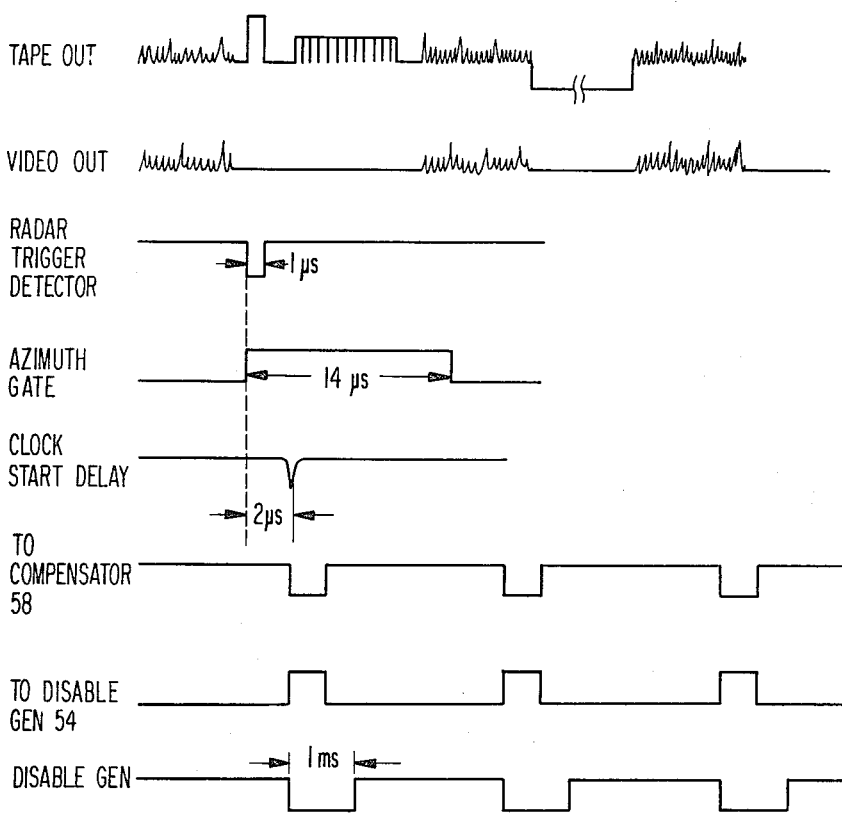
FIG. 2B is a schematic showing illustrating several typical waveforms found at identified locations in the demultiplexer.

As indicated above, the stripper 53 is provided with the composite video signal, and produces two outputs, one is the sync signal alone, with the remaining elements in the composite video stripped therefrom, which is provided to the compensator 58 and the clipper 57. The other output of the stripper 53 is the synchronizing signal in inverted form, provided to the disable generator 54. As shown in FIG. 2A, the disable generator 54 includes a stop 60 Hz. disable generator 68 which provides an output to reset flip-flop 69 and a start 60 Hz. disable generator 70 which responds to the same resetting signal. The start 60 Hz. disable generator 70 provides a setting input to the flip-flop 69. The stop 60 Hz. disable generator can comprise a monostable multivibrator whose astable period may provide delays to compensate for delays in other parts of the apparatus. The start 60 Hz. disable generator 70 can comprise another monostable multivibrator to set the flip-flop 69 a predetermined period after the flip-flop 69 is reset. The effect of this apparatus is shown in FIG. 2B wherein the control pulse stream which forms the output of the disable generator 54 is illustrated. As shown, this output provides a replica of the sync pulses wherein a sync pulse period has been lengthened; for example, the pulse period may be lengthened from the nominal 0.4 millisecond in the composite video to a full millisecond in the output of the disable generator 54. The output of the disable generator 54 is provided as one input to an AND gate 71, the function of which will be explained hereinafter.

As explained above, the radar trigger detector 55 responds to the radar trigger in a composite video and initiates the azimuth gate generator 61. One output of the azimuth gate generator 61 controls the azimuth blanking circuit 60 to blank the composite video for 14 microseconds, which is sufficient to blank out not only the radar trigger but also the pulse width modulated azimuth data. The azimuth data detector 62 also responds to the azimuth gate, and has provided to it the output of video amplifier 59. The azimuth data detector 62 performs a gating function. It gates the radar trigger and pulse width modulated data to the azimuth data validator 72 and the demodulator and shift register 67. The azimuth data validator 72 merely counts the number of pulse width modulated pulses and provides an output if valid data is detected, i.e., 12 data pulses are detected in the last 12 microseconds. The demodulator and shift register 67 responds to the pulse width modulated data under control of the clock pulses provided by counter 65 to demodulate the pulse width modulated data and load, in serial fashion, a shift register. The AND gate 71 produces a strobing signal to allow the data now stored in the shift register 67 to be loaded in the latch 73 in response to the output of the azimuth data validator 72, so long as it does not occur during the 1 millisecond low output of the disable generator 54. During this period, the gate 71 is inhibited from providing the strobing signal. The latch 73 can provide digital data, in parallel form, to a PPI display. A digital to synchro converter 75 may be coupled to latch 73 to provide the azimuth data in synchro format, if necessary. The strobing signal, produced by the output of AND gate 71, is also provided to the radar re-trigger generator 52 which produces the radar trigger pulse of suitable form. For example, this pulse might be 3 microseconds in duration.

In operation, the composite video is provided to the clipper 57 and stripper 53; this signal may take the form identified as Tape Out in FIG. 2B. The combined operation of clipper 57, compensator 58 and amplifier 59 serves to remove the synchronizing pulses from the video data stream. The azimuth blanker 60 removes the radar timing signal as well as the pulse width modulated azimuth data such that the driver 63 produces a video waveform having the form illustrated in FIG. 2B identified as Video Out.

The radar trigger detector 55 responds to the radar trigger in the composite video to produce an output pulse having the form shown in FIG. 2B. The azimuth gate generator 61 responds to this pulse to produce an azimuth gate, as shown in FIG. 2B. The gated clock generator responds to the radar trigger detector output to produce the clock start delay, as shown in FIG. 2B. The clock signal developed in the gated clock generator, provides clocking signals for demodulating the azimuth data and loading shift register 67. The pulse width modulated data stream is coupled through the azimuth data detector in response to the azimuth gate. When the azimuth data validator 72 responds to the required number of data pulses it enables AND gate 71 to produce a strobing signal to strobe the contents of shift register 67 into the latch 73. Simultaneously, the radar re-trigger generator 52 responds to the strobing pulse to produce a radar trigger. If the azimuth data occurs during the lengthened period of the output of the 60 Hz. disable gate, the gate 71 is inhibited and thus the strobing pulse is not produced and therefore the latch 73 is not loaded and the radar re-trigger generator does not operate.

Thus, the demultiplexer produces three inputs to the PPI display, a video signal containing the radar video, a 12 bit binary word presented in parallel representing the antenna azimuth, and a properly timed radar trigger pulse. With these signals, the PPI display converts the radar video into a visual display at the correct azimuth.

Alternatively, the output of latch 73 can be converted to synchro form by the digital to synchro converter 75. If employed, the converter 75 can provide azimuth data to the PPI in synchro form.

Although a number of circuits in FIG. 2A are disclosed in block diagram form, the disclosure herein of the function performed by the circuits is sufficient to enable those skilled in the art to produce or select well known circuits for those functions.

Now that we have shown a multiplexer which is capable of accepting conventional radar signals and producing a composite signal capable of being recorded on a conventional TV video recorder, and a demultiplexer capable of accepting the output signals of a conventional TV recorder, which have been recorded as produced by our multiplexer, and producing therefrom signals for driving a conventional PPI display, it should be apparent that the conventional TV video recorder employed, need not be modified in any respect. Inasmuch as the conventional TV video recorder need not be modified, conventional TV audio and video program material may be interspersed on a magnetic tape with radar video recorded as disclosed above.

Figure 3:
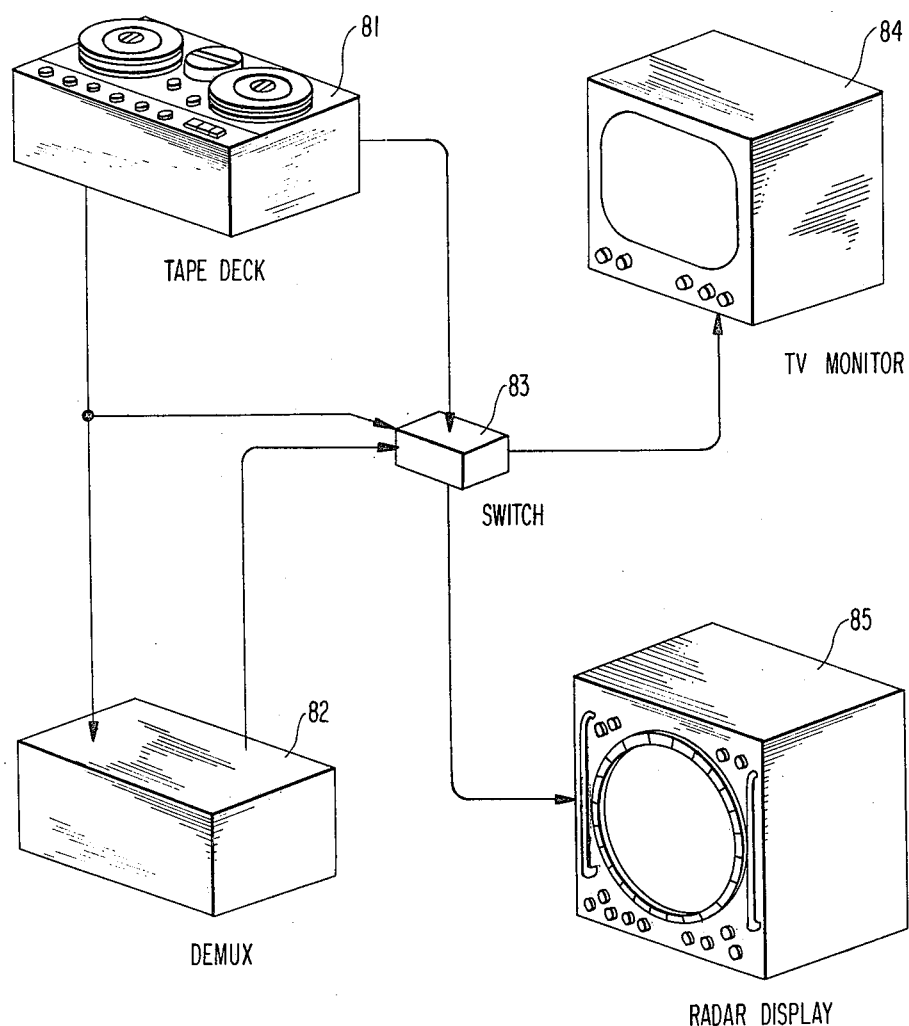
FIG. 3 is a block diagram illustrating the invention employed to play back interspersed TV and radar for driving both a conventional TV monitor and PPI display.

Accordingly, apparatus may be assembled as shown in FIG. 3.

FIG. 3 illustrates a conventional TV video tape deck 81, operating in the playback mode. The demultiplexer of our invention 82 receives, as an input, the output of the tape deck 81. The demultiplexer 82 provides an input to a switching apparatus 83, which also receives, as an input, the video output of the tape deck 81 and the audio output of tape deck 81. The output of switching apparatus 83 is provided to both a conventional TV monitor 84 and a conventional radar display 85. The switching apparatus 83 is capable of conveying the audio and video output of demultiplexer 82 to the radar display 85. The switching apparatus 83 can, for example, respond to audio signals, in a predetermined frequency range, recorded on the audio band of the video recorder 81. Thus, radar and conventional audio and video TV program material may be interspersed on a common tape and a TV monitor 84 and radar display 85 can be enabled sequentially to alternately display the interspersed recorded material. This capability is particularly useful for training purposes.

What is claimed is:

1. Apparatus to adapt signals from a radar system for recording on a TV video recorder and to adapt played back signals from said TV video recorder to drive a PPI display, said apparatus including a multiplexer providing to said TV video recorder a signal stream including a radar timing signal, a pulse stream containing azimuth information, a radar video signal, and a head synchronizing pulse stream of pulse rate independent of said radar timing signal and a demultiplexer for adapting said played back signal, comprising a replica of said signal stream, for driving said PPI display, said demultiplexer comprising:
   video processor means responsive to said played back signal for outputting only said radar video signal to said PPI display,
   disable generator means responsive to said head synchronizing pulse stream for providing a control pulse stream of rate equal to said head synchronizing pulse rate but of width larger than said head synchronizing pulse,
   means for demodulating said pulse stream containing azimuth information,
   coupling means responsive to said means for demodulating for coupling azimuth information to said PPI display,
   and inhibiting means for inhibiting operation of said coupling means during the duration of any of said control pulses.

2. The apparatus of claim 1 wherein said demultiplexer further includes:
   a radar retrigger generator responsive to said coupling means for generating a radar trigger for said PPI display.

3. The apparatus of claim 1 wherein said coupling means includes a synchro converter responsive to said azimuth information for coupling synchro signals representative of azimuth information to said PPI display.

4. The apparatus of claim 1 wherein said disable generator includes a bi-stable device switched between two conditions to output a pulse stream, and at least one monostable multivibrator operated simultaneously with switching of said bi-stable device for, at the conclusion of a preset period, switching said bi-stable device whereby said bi-stable device outputs a pulse of length dependent upon said monostable multivibrator.

5. The apparatus of claim 1 or 2 wherein said coupling means includes a latch and a gate normally generating a strobing signal, and wherein said inhibiting means includes an input to said gate, from said disable generator, for inhibiting said strobing signal during the existence of a control pulse.

6. The apparatus of claim 2 wherein said multiplexer includes:
   a summing network with plural inputs and an output coupled to said TV video recorder,
   a reference frequency generator and shaping circuit coupled thereto for generating a pulse stream for synchronizing head movement of said TV video recorder at said reference frequency, and means coupling said pulse stream to said summing network,
   modulator means responsive to azimuth information signals from said radar system for producing an azimuth pulse stream, in response to a first timing signal, carrying said azimuth information, and means coupling said azimuth pulse stream to said summing network,
   video blanking means responsive to said radar system and to a second timing signal for blanking portions of a radar video signal from said radar system and means coupling said unblanked radar video signal to said summing network, and
   timing means responsive to said radar system for generating said first and second timing signals so that said azimuth pulse stream is produced within blanked portions of said radar video.

7. The apparatus of claim 6 which further includes:
   radar trigger timing means responsive to a third timing signal for producing a radar trigger signal and means coupling said radar trigger signal to said summing network, and wherein
   said timing means also generates a third timing signal so that said radar trigger signal is produced within blank portions of said radar video.

8. The apparatus of claim 6 or 7 in which said pulse stream is of one polarity and all other signals from said summing network are of another polarity.

9. The apparatus of claim 8 wherein said disable generator responds to signals of only one polarity.

* * * * *